US008842415B2

United States Patent
Ahn et al.

(10) Patent No.: US 8,842,415 B2
(45) Date of Patent: Sep. 23, 2014

(54) MULTILAYER CERAMIC CAPACITOR

(71) Applicant: Samsung Electro-Mechanics Co., Ltd., Gyunggi-do (KR)

(72) Inventors: Young Ghyu Ahn, Gyunggi-do (KR); Byoung Hwa Lee, Gyunggi-do (KR); Min Cheol Park, Gyunggi-do (KR); Sang Soo Park, Gyunggi-do (KR); Dong Seok Park, Seoul (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 0 days.

(21) Appl. No.: 13/693,586

(22) Filed: Dec. 4, 2012

(65) Prior Publication Data

US 2013/0094119 A1 Apr. 18, 2013

Related U.S. Application Data

(63) Continuation of application No. 13/531,237, filed on Jun. 22, 2012, now Pat. No. 8,351,180.

(30) Foreign Application Priority Data

Jun. 23, 2011 (KR) .................. 10-2011-0061343

(51) Int. Cl.
*H01G 4/06* (2006.01)
(52) U.S. Cl.
USPC .............. 361/321.2; 361/306.1; 361/306.3; 361/311; 361/313
(58) Field of Classification Search
USPC ............ 361/321.2, 321.1, 311–313, 306.1, 361/306.3, 303–305
See application file for complete search history.

(56) References Cited

U.S. PATENT DOCUMENTS

| 6,069,786 A | 5/2000 | Horie et al. |
| 6,292,353 B1 | 9/2001 | Haratani et al. |
| 7,177,137 B2 | 2/2007 | Ritter et al. |

(Continued)

FOREIGN PATENT DOCUMENTS

| JP | 08-162362 A | 6/1996 |
| JP | 2000-315621 A | 11/2000 |
| JP | 2002-170736 A | 6/2002 |

(Continued)

OTHER PUBLICATIONS

Japanese Office Action issued in corresponding Japanese Application No. 2012-139450, dated Jul. 1, 2014, with English translation.

*Primary Examiner* — Nguyen T Ha

(74) *Attorney, Agent, or Firm* — McDermott Will & Emery LLP

(57) ABSTRACT

There is provided a multilayer ceramic capacitor, including: a multilayer body in which a plurality of dielectric layers are stacked in a thickness direction; and inner electrode layers formed within the multilayer body and including first and second inner electrodes disposed to be opposed to each other; wherein a ratio (MA1/CA1) of MA1 to CA1 is between 0.07 and 0.20, wherein CA1 represents an area of the multilayer body in a cross section of the multilayer body taken in a length and thickness direction, and MA1 represents an area of a first margin part in the cross section of the multilayer body taken in the length and thickness direction, the first margin part being a portion of the multilayer body, other than a first capacitance forming part thereof in which the first and second inner electrodes overlap in the thickness direction.

6 Claims, 4 Drawing Sheets

A-A'

(56) References Cited

U.S. PATENT DOCUMENTS

| | | |
|---|---|---|
| 7,319,582 B2 | 1/2008 | Takashima et al. |
| 7,436,650 B2 | 10/2008 | Oguni et al. |
| 7,551,422 B2 | 6/2009 | Togashi |
| 7,688,568 B1 | 3/2010 | Lee et al. |
| 8,194,390 B2 | 6/2012 | Kim et al. |
| 8,351,180 B1 * | 1/2013 | Ahn et al. ............... 361/321.2 |

FOREIGN PATENT DOCUMENTS

| | | |
|---|---|---|
| JP | 2005-1363132 | 5/2005 |
| JP | 2010-010157 A | 1/2010 |
| KR | 10-2007-0092657 | 9/2007 |

* cited by examiner

A-A'

A-A'

B-B'

B-B'

'X'

MULTILAYER CERAMIC CAPACITOR

CROSS-REFERENCE TO RELATED APPLICATIONS

This application is a Continuation of U.S. application Ser. No. 13/531,237, filed on Jun. 22, 2012, which claims the priority of Korean Patent Application No. 10-2011-0061343 filed on Jun. 23, 2011, in the Korean Intellectual Property Office, the disclosure of which is incorporated herein by reference.

BACKGROUND OF THE INVENTION

1. Field of the Invention

The present invention relates to a multilayer ceramic capacitor, and more particularly, to a multilayer ceramic capacitor capable of reducing acoustic noise and implementing high capacitance while suppressing generation of delamination.

2. Description of the Related Art

Generally, electronic components using a ceramic material, such as a capacitor, an inductor, a piezoelectric element, a varistor, or a thermistor, or the like, include a ceramic body made of a ceramic material, inner electrodes formed within the ceramic body, and outer electrodes mounted on a surface of the ceramic body so to be connected to the inner electrodes.

Among ceramic electronic components, a multilayer ceramic capacitor has been widely used as a component for mobile communication devices, such as computers, PDAs, mobile phones, or the like, due to advantages such as miniaturization, high capacitance, ease of mounting, or the like.

Recently, with the recent trend toward an increase in small multi-functional electronics, demand for small multi-functional multilayer ceramic capacitors has also increased. As a result, a multilayer ceramic capacitor in which the thickness of a dielectric layer is reduced and the number of multilayered layers thereof is increased has recently been manufactured.

However, acoustic noise generated due to a piezoelectric phenomenon of the multilayer ceramic capacitor using a ferroelectric material may cause serious defects in some electronic devices.

Acoustic noise may be a factor in noise generation in electronic devices equipped with the multilayer ceramic capacitor.

SUMMARY OF THE INVENTION

An aspect of the present invention provides a small-sized and high-capacitance multilayer ceramic capacitor having high reliability and reduced acoustic noise while suppressing a generation of delaminations.

According to an embodiment of the present invention, there is provided a multilayer ceramic capacitor, including: a multilayer body in which a plurality of dielectric layers are stacked in a thickness direction; and inner electrode layers formed within the multilayer body and including first and second inner electrodes disposed to be opposed to each other while having each dielectric layer disposed therebetween and having respective ends alternately exposed to sides of the multilayer body, opposing each other; wherein a ratio (MA1/CA1) of MA1 to CA1 is between 0.07 and 0.20, wherein CA1 represents an area of the multilayer body in a cross section of the multilayer body taken in a length and thickness direction, and MA1 represents an area of a first margin part in the cross section of the multilayer body taken in the length and thickness direction, the first margin part being a portion of the multilayer body, other than a first capacitance forming part thereof in which the first and second inner electrodes overlap in the thickness direction in the cross section of the multilayer body taken in the length and thickness direction.

A ratio (C1/A1) of C1 to A1 may be between 0.35 and 2.0, wherein A1 represents an area of a first length margin part in the cross section of the multilayer body taken in the length and thickness direction, the first length margin part being a portion of the first margin part extending from the first capacitance forming part in a length direction, and C1 represents an area of a first thickness margin part in the cross section of the multilayer body taken in the length and thickness direction, the first thickness margin part being a portion of the first margin part extending from the first capacitance forming part in a thickness direction in the cross section of the multilayer body taken in the length and thickness direction.

A ratio (MA2/CA2) of MA2 to CA2 may be between 0.10 and 0.28, wherein CA2 represents an area of the multilayer body in a cross section of the multilayer body taken in a width and thickness direction, and MA2 represents an area of a second margin part in the cross section of the multilayer body taken in the width and thickness direction, the second margin part being a portion of the multilayer body, other than a second capacitance forming part thereof in which the first and second inner electrodes overlap in the thickness direction in the cross section of the multilayer body taken in the width and thickness direction.

A ratio (C2/B1) of C2 to B1 may be between 0.30 and 1.35, wherein B1 represents an area of a first width margin part in the cross section of the multilayer body taken in the width and thickness direction, the first width margin part being a portion of the second margin part extending from the second capacitance forming part in a width direction in the cross section of the multilayer body taken in the width and thickness direction, and C2 represents an area of a second thickness margin part in the cross section of the multilayer body taken in the width and thickness direction, the second thickness margin part being a portion of the second margin part extending from the second capacitance forming part in a thickness direction in the cross section of the multilayer body taken in the width and thickness direction.

A thickness of the dielectric layer may be 3 μm or less.

An average particle diameter of ceramic powder particles used for the dielectric layer may be 0.3 μm or less.

According to another embodiment of the present invention, there is provided a multilayer ceramic capacitor, including: a multilayer body in which a plurality of dielectric layers are stacked in a thickness direction; and inner electrode layers formed within the multilayer body and including first and second inner electrodes disposed to be opposed to each other while having each dielectric layer disposed therebetween and having respective ends alternately exposed to sides of the multilayer body, opposing each other; wherein a ratio (MA2/CA2) of MA2 to CA2 is between 0.10 and 0.28, wherein CA2 represents an area of the multilayer body in a cross section of the multilayer body taken in a width and thickness direction, and MA2 represents an area of a second margin part in the cross section of the multilayer body taken in the width and thickness direction, the second margin part being a portion of the multilayer body, other than a second capacitance forming part in which the first and second inner electrodes overlap in the thickness direction in the cross section of the multilayer body taken in the width and thickness direction.

A ratio (C2/B1) of C2 to B1 may be between 0.30 and 1.35, wherein B1 represents an area of a first width margin part in the cross section of the multilayer body taken in the width and thickness direction, the first width margin part being a portion of the second margin part extending from the second capacitance forming part in a width direction in the cross section of the multilayer body taken in the width and thickness direction, and C2 represents an area of a second thickness margin part in the cross section of the multilayer body taken in the width and thickness direction, the second thickness margin part being a portion of the second margin part extending from the second capacitance forming part in a thickness direction in the cross section of the multilayer body taken in the width and thickness direction.

A thickness of the dielectric layer may be 3 μm or less.

An average particle diameter of ceramic powder particles used for the dielectric layer may be 0.3 μm or less.

According to another embodiment of the present invention, there is provided a multilayer ceramic capacitor, including: a multilayer body including a dielectric layer having a thickness of 3 μm or less; and first and second inner electrodes having the dielectric layer disposed therebetween, wherein the number of grains disposed between the first and second inner electrodes is 10 or more in a thickness direction of the dielectric layer, and a ratio (MA1/CA1) of MA1 to CA1 is between 0.07 and 0.20, wherein CA1 represents an area of the multilayer body in a cross section of the multilayer body taken in a length and thickness direction, and MA1 represents an area of a first margin part in the cross section of the multilayer body taken in the length and thickness direction, the first margin part being a portion of the multilayer body, other than a first capacitance forming part thereof in which the first and second inner electrodes overlap in the thickness direction in the cross section of the multilayer body taken in the length and thickness direction.

A ratio (C1/A1) of C1 to A1 may be between 0.35 and 2.0, wherein A1 represents an area of a first length margin part in the cross section of the multilayer body taken in the length and thickness direction, the first length margin part being a portion of the first margin part extending from the first capacitance forming part in a length direction, and C1 represents an area of a first thickness margin part in the cross section of the multilayer body taken in the length and thickness direction, the first thickness margin part being a portion of the first margin part extending from the first capacitance forming part in a thickness direction in the cross section of the multilayer body taken in the length and thickness direction.

A ratio (MA2/CA2) of MA2 to CA2 may be between 0.10 and 0.28, wherein CA2 represents an area of the multilayer body in a cross section of the multilayer body taken in a width and thickness direction, and MA2 represents an area of a second margin part in the cross section of the multilayer body taken in the width and thickness direction, the second margin part being a portion of the multilayer body, other than a second capacitance forming part thereof in which the first and second inner electrodes overlap in the thickness direction in the cross section of the multilayer body taken in the width and thickness direction.

A ratio (C2/B1) of C2 to B1 may be between 0.30 and 1.35, wherein B1 represents an area of a first width margin part in the cross section of the multilayer body taken in the width and thickness direction, the first width margin part being a portion of the second margin part extending from the second capacitance forming part in a width direction in the cross section of the multilayer body taken in the width and thickness direction, and C2 represents an area of a second thickness margin part in the cross section of the multilayer body taken in the width and thickness direction, the second thickness margin part being a portion of the second margin part extending from the second capacitance forming part in a thickness direction in the cross section of the multilayer body taken in the width and thickness direction.

According to another embodiment of the present invention, there is provided a multilayer ceramic capacitor, including: a multilayer body including a dielectric layer having a thickness of 3 μm or less; and first and second inner electrodes having the dielectric layer disposed therebetween, wherein the number of grains disposed between the first and second inner electrodes is 10 or more in a thickness direction of the dielectric layer, and a ratio (MA2/CA2) of MA2 to CA2 is between 0.10 and 0.28, wherein CA2 represents an area of the multilayer body in a cross section of the multilayer body taken in a width and thickness direction, and MA2 represents an area of a second margin part in the cross section of the multilayer body taken in the width and thickness direction, the second margin part being a portion of the multilayer body, other than a second capacitance forming part thereof in which the first and second inner electrodes overlap in the thickness direction in the cross section of the multilayer body taken in the width and thickness direction.

A ratio (C2/B1) of C2 to B1 may be between 0.30 and 1.35, wherein B1 represents an area of a first width margin part in the cross section of the multilayer body taken in the width and thickness direction, the first width margin part being a portion of the second margin part extending from the second capacitance forming part in a width direction in the cross section of the multilayer body taken in the width and thickness direction, and C2 represents an area of a second thickness margin part in the cross section of the multilayer body taken in the width and thickness direction, the second thickness margin part being a portion of the second margin part extending from the second capacitance forming part in a thickness direction in the cross section of the multilayer body taken in the width and thickness direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Figure 1:
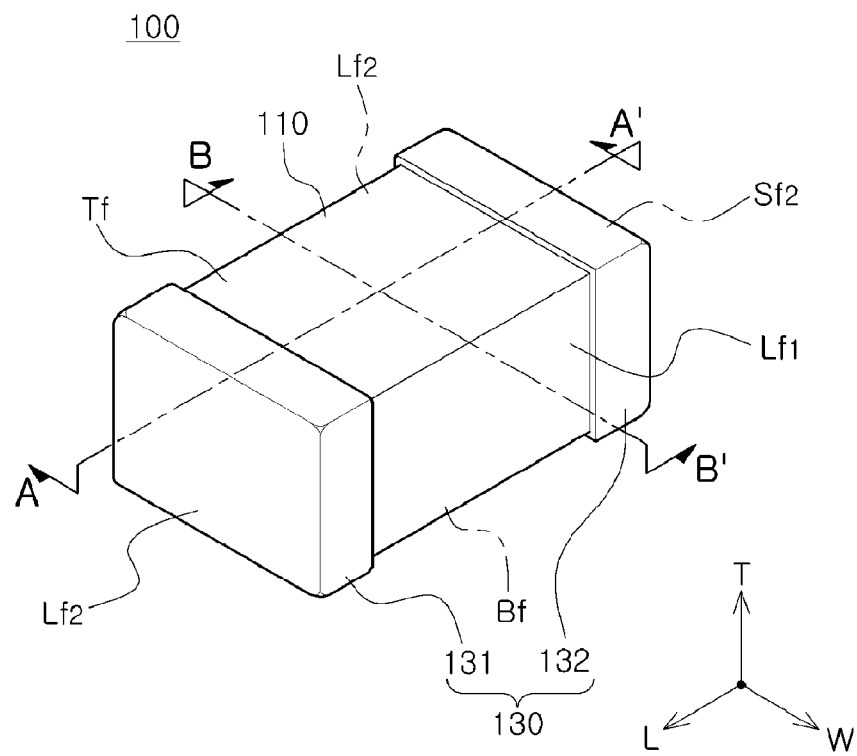
FIG. 1 is an exterior perspective view of a multilayer ceramic capacitor according to an embodiment of the present invention.
Figure 2:
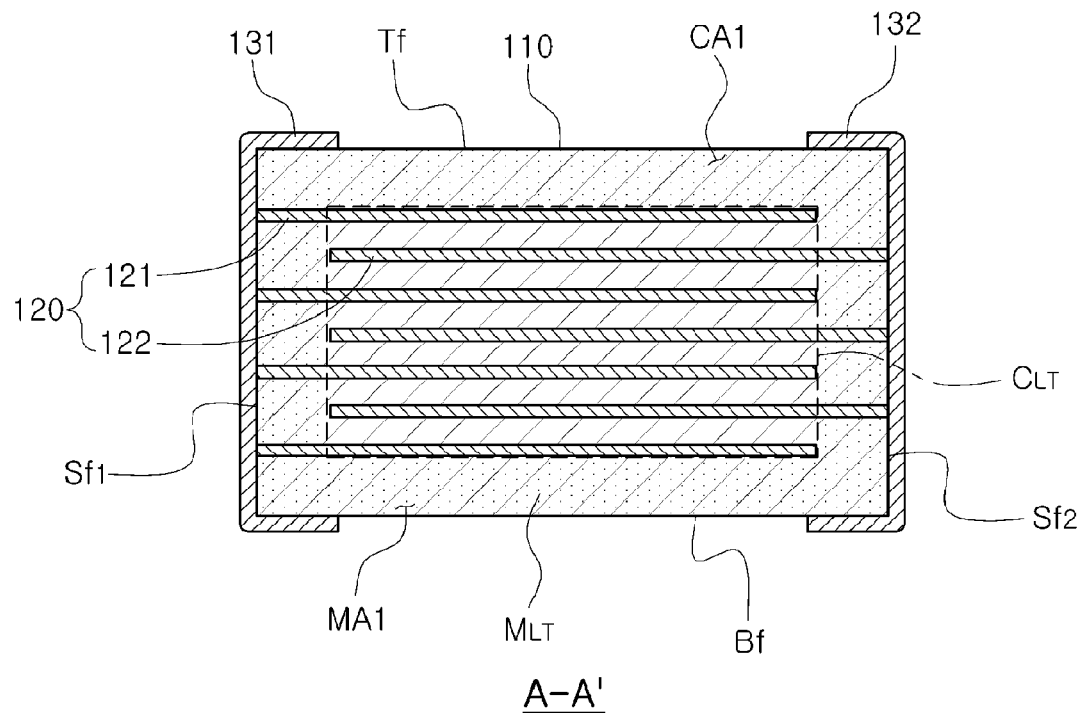
FIG. 2 is a cross-sectional view of the multilayer ceramic capacitor of FIG. 1 according to the embodiment of the present invention, taken along direction A-A'.
Figure 3:
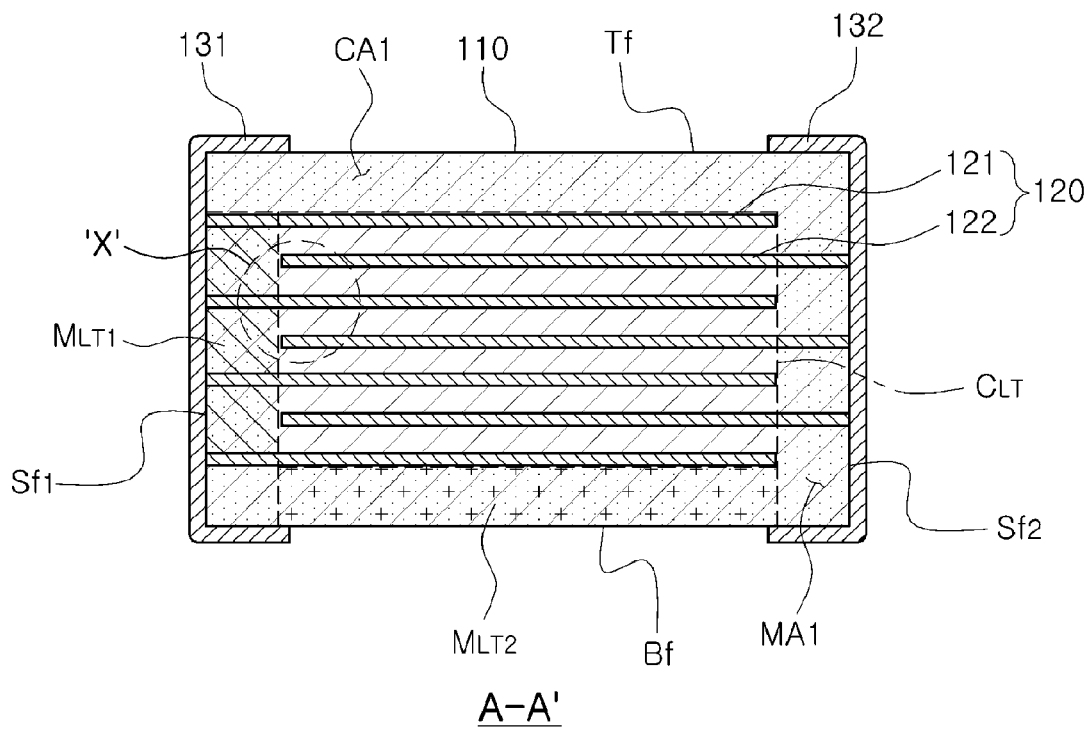
FIG. 3 is a cross-sectional view of the multilayer ceramic capacitor of FIG. 1 according to another embodiment of the present invention, taken along direction A-A'.
Figure 4:
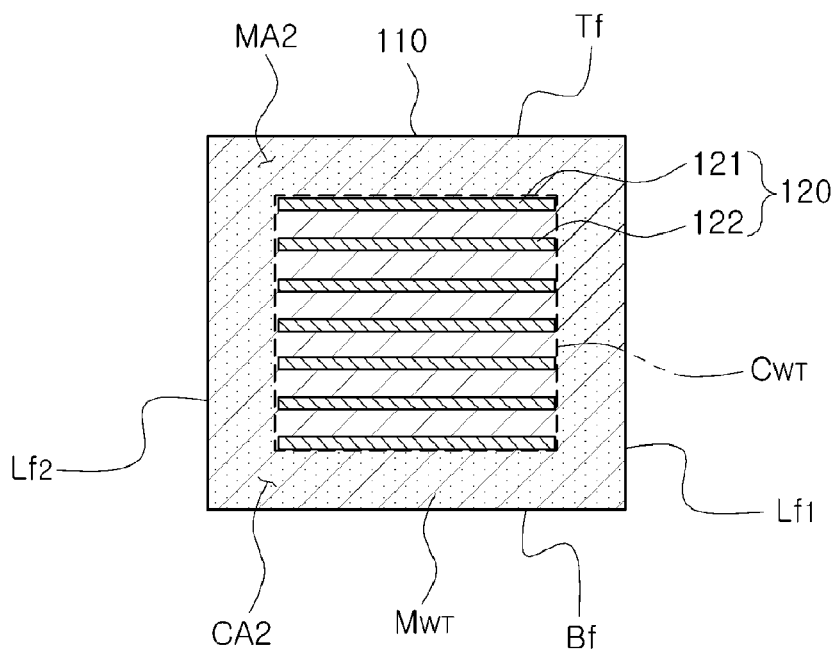
FIG. 4 is a cross-sectional view of the multilayer ceramic capacitor of FIG. 1 according to the embodiment of the present invention, taken along direction B-B'.
Figure 5:
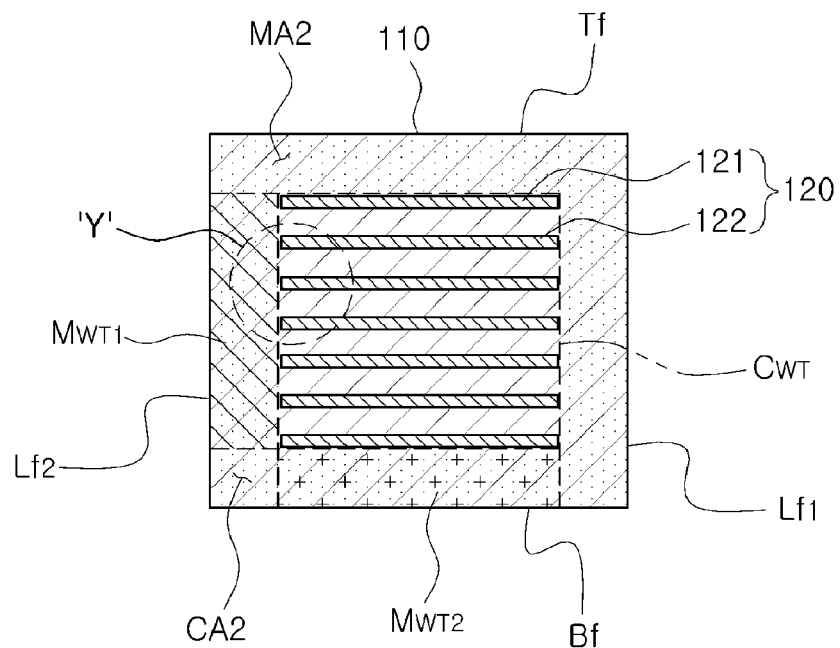
FIG. 5 is a cross-sectional view of the multilayer ceramic capacitor of FIG. 1 according to another embodiment of the present invention, taken along direction B-B'.
Figure 6:
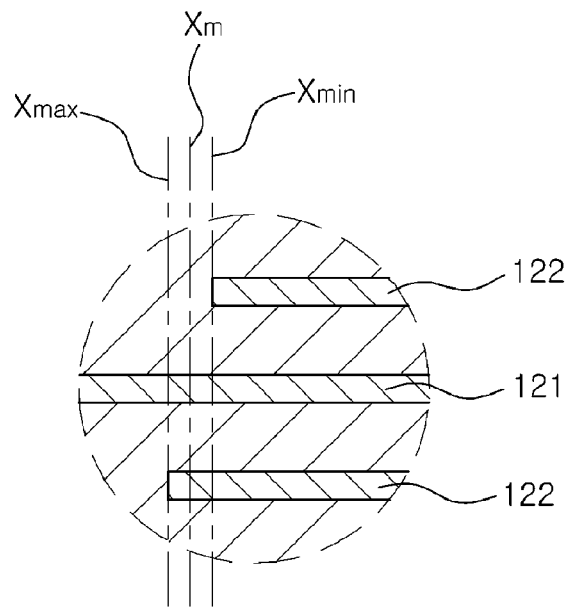
FIG. 6 is an enlarged view of X shown in FIG. 3.
Figure 7:
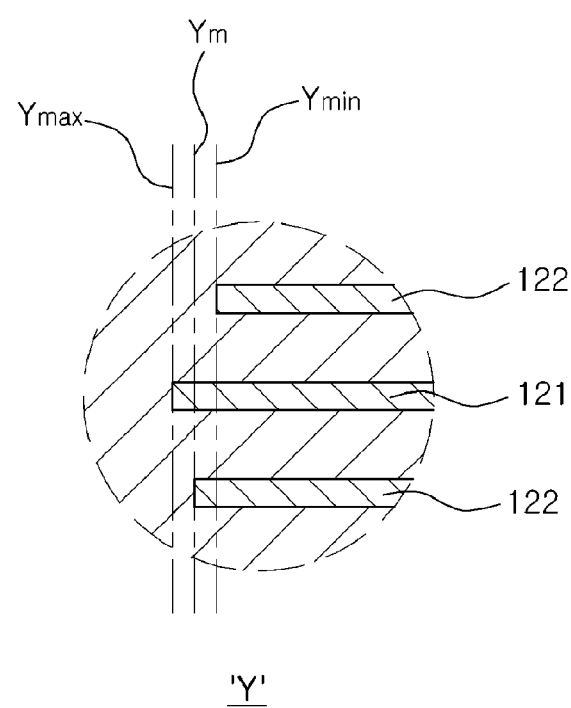
FIG. 7 is an enlarged view of Y shown in FIG. 5.

FIG. 1 is an exterior perspective view of a multilayer ceramic capacitor according to an embodiment of the present invention. FIGS. 2 and 3 are cross-sectional views of the multilayer ceramic capacitor of FIG. 1, taken along direction A-A'. FIGS. 4 and 5 are cross-sectional views of the multilayer ceramic capacitor of FIG. 1, taken along direction B-B';

FIG. 6 is an enlarged view of X shown in FIG. 3. FIG. 7 is an enlarged view of Y shown in FIG. 5.

Referring to FIGS. 1 to 5, a multilayer ceramic capacitor 100 according to an embodiment of the present invention may include a multilayer body 110 and outer electrodes 130.

The multilayer body 110 may have a rectangular parallelepiped shape. In the embodiment of the present invention, surfaces in a lamination direction are defined as a top face Tf and a bottom face Bf, surfaces in a length direction are defined as first and second short faces Sf1 and Sf2, and surfaces in a width direction are defined as first and second long faces Lf1 and Lf2, respectively.

Meanwhile, with regard to the multilayer ceramic capacitor in the embodiment of the present invention, a 'length direction' may be defined as an 'L' direction shown in FIG. 1. Likewise, a 'width direction' may be defined as a 'W' direction and a 'thickness direction' may be defined as a 'T' direction. Here, the 'thickness direction' may have the same conception as a direction of stacked dielectric layers, that is, a 'lamination direction.'

The multilayer body 110 may be formed by laminating a plurality of dielectric layers in the thickness direction T. The plurality of dielectric layers constituting the multilayer body 110 may be in a fired state so as not to confirm a boundary between adjacent dielectric layers.

Herein, each dielectric layer may be formed of a ceramic powder having a high dielectric permittivity and the ceramic powder used herein may include, but is not limited to, barium titanate ($BaTiO_3$) powder, strontium titanate ($SrTiO_3$) powder, or the like.

In the embodiment of the present invention, a thickness of one of the plurality of dielectric layers may be 3 μm or less and an average particle diameter of fired grains disposed in the single dielectric layer may be 0.3 μm or less. That is, the average grain size of the dielectric layer may be ¹/₁₀ or less of the thickness of the dielectric layer. Therefore, the number of grains disposed between two inner electrodes or in the single dielectric layer may be 10 or more in the thickness direction of the dielectric layer.

In the embodiment of the present invention, the thickness of the dielectric layer may mean an average thickness of a dielectric layer that is disposed between inner electrode layers 121 and 122. The average thickness of the dielectric layer may be measured by image-scanning a cross-section in the length direction of the multilayer body 110 through a scanning electron microscope (SEM), as shown in FIG. 2. As shown in FIG. 2, for example, the average thickness may be acquired by measuring thicknesses of a dielectric layer in 30 positions in the length direction thereof, the 30 positions being located at equal intervals, from an extracted image of the dielectric layer obtained by scanning a cross-section taken in a length-thickness direction (L-T) at the center of the multilayer body 110 in the width direction, through the SEM, and then averaging the values of the measured thicknesses. The 30 positions located at equal intervals may be determined in a capacitance formation part referring to a region on which the first and second internal electrodes 121 and 122 are overlapped. In addition, in a case in which the measurement of an average value is executed with respect to 10 dielectric layers or more, the average thickness of each of the dielectric layers may be more generalized.

In addition, the average thickness of the dielectric layer may also be measured from an image obtained by scanning a cross section taken in a width and thickness direction W-T at the center of the multilayer body 110 in the length direction through the SEM.

In this case, the center of the multilayer body 110 in the width direction or the length direction thereof may be defined as a point within a range of 30% of the width or the length of the multilayer body from the center of the multilayer body 110 in the width or length direction.

Meanwhile, the average grain size of the dielectric layer may be measured by analyzing a cross sectional photograph of the dielectric layer extracted through the SEM. For example, the average grain size of the dielectric layer may be measured by using grain size measurement software that supports an average grain size standard measurement method defined in American Society for Testing and Materials (ASTM) E112.

The inside of the multilayer body 110 may be provided with a plurality of inner electrode layers 120. The inner electrode layers 120 are disposed on the dielectric layers in the lamination direction of the dielectric layers so as to be opposed to each other while having the single dielectric layer disposed therebetween.

The plurality of inner electrode layers 120 may be made of a conductive metal, for example, Ni or a Ni alloy. The Ni alloy may include Mn, Cr, Co, or Al, together with Ni. The inner electrode layers 120 may be formed by printing a conductive paste including a metal powder such as nickel (Ni), or the like, on a surface of a ceramic green sheet forming the dielectric layers in a predetermined pattern. The embodiment of the present invention is not limited thereto, but the thickness of each inner electrode layer may be 0.7 μm or less.

In addition, according to the embodiment of the present invention, 200 or more dielectric layers, or 500 or more dielectric layers, each having the inner electrode layers 120 formed thereon may be laminated.

The plurality of internal electrodes 120 may include a plurality of first internal electrodes 121 and a plurality of second internal electrodes 122, having opposing polarities. The first inner electrode 121 and the second inner electrode 122 may be alternately laminated so as to be opposed to each other according to the lamination direction thereof, having the dielectric layer disposed therebetween.

The plurality of the first internal electrodes 121 may have one ends exposed to the first short face Sf1 of the multilayer body 110, while the plurality of second internal electrodes 122 may have one ends opposed to the exposed ends of the first internal electrodes 121 in the length direction and exposed to the second short face Sf2.

One ends of the plurality of the first internal electrodes 121 exposed to the first short face Sf1 may be connected to a first external electrode 131, while one ends of the plurality of second internal electrodes 122 exposed to the second short face Sf2 may be connected to a second external electrode 132.

The outer electrodes 130 may include the first outer electrode 131 and the second outer electrode 132 formed on two sides of the multilayer body 110, facing each other. As shown in FIG. 1, the first outer electrode 131 may be formed to cover the first short side Sf1 of the multilayer body 110 and the second outer electrode 132 may be formed to cover the second short side Sf2.

In the embodiment of the present invention, the first outer electrode 131 and the second outer electrode 132 may be formed to cover both short sides of the multilayer body 110, but the embodiment of the present invention is not limited thereto. Therefore, the first and second outer electrodes 131 and 132 may be formed to cover both long sides Lf1 and Lf2 of the multilayer body 110.

The first outer electrode 131 and the second outer electrode 132 may be electrically separated from each other. The first outer electrode 131 may be electrically connected to the one ends of the first inner electrodes 121 exposed to the first short side Sf1 of the multilayer body 110 and the second outer electrode 132 may be electrically connected to the one ends of the second inner electrodes 122 exposed to the second short side Sf2 facing the first short side Sf1 of the multilayer body 110 in the length direction. As a result, the outer electrodes 130 may serve as external terminals.

The outer electrodes 130 may be made of copper, a copper (Cu) alloy, or the like.

Hereinafter, electrical characteristics of the multilayer ceramic capacitor according to the embodiment of the present invention will be described.

In the multilayer body 110, capacitance may be formed in a portion ("overlapping portion") in which the plurality of first inner electrodes 121 and the plurality of second inner electrodes 122 overlap in the lamination direction, and the remaining portion other than the above portion may serve to protect the portion in which the capacitance is formed. Hereinafter, the overlapping portion may be referred to as a capacitance forming part and the remaining portion other than the capacitance forming part may be referred to as a margin part.

When voltage is applied to the multilayer body 110, the multilayer body 110 is distorted due to a piezoelectric phenomenon. The distortion may be caused by a first capacitance forming part $C_{LT}$.

In particular, when the multilayer body 110 is mounted on a circuit board such that the first and second inner electrodes 121 and 122 are parallel with the surface of the circuit board, a point of the multilayer body 100, in which distortion thereof becomes maximal, may be the central portion of the multilayer body 110. In this case, a first margin part $M_{LT}$ serves to suppress the distortion of the multilayer body 110.

According to the embodiment of the present invention an area ratio of the first margin part $M_{LT}$ may be set to be in a predetermined range to effectively suppress the distortion of the multilayer body 110 and reduce vibrations in the multilayer body 111 and the circuit board to thereby reduce acoustic noise.

The thickness of the dielectric layer may be reduced and at the same time, the average grain size within each dielectric layer may be set to be 1/10 or less of the thickness of the dielectric layer so as to reduce the acoustic noise, whereby a multilayer ceramic capacitor having low dielectric permittivity may be implemented.

As described above, when the multilayer ceramic capacitor having low dielectric permittivity may be implemented by reducing the thickness of the dielectric layer and the average grain size within the dielectric layer, the acoustic noise may be reduced.

However, a reduction in acoustic noise is remarkably reduced in the multilayer ceramic capacitor manufactured in such a manner that a distance between the first and second inner electrodes 121 and 122 within the multilayer body 110, that is, the thickness of the dielectric layer is set to be 3 μm or less and the number of grains within the dielectric layer is 10 or more.

This can be more clearly appreciated from the following Table 1.

TABLE 1

| No | Dielectric Thickness (td, μm) | Grain Size (Dc, μm) | td/Dc | Acoustic noise (dB) |
|---|---|---|---|---|
| 1 | 4.3 | 0.68 | 6.3 | 43.7 |
| 2 |  | 0.58 | 7.4 | 43.1 |
| 3 |  | 0.43 | 10.0 | 36.3 |
| 4 |  | 0.26 | 16.5 | 33.1 |
| 5 | 2.8 | 0.59 | 4.7 | 43.2 |
| 6 |  | 0.45 | 6.2 | 42.1 |
| 7 |  | 0.26 | 10.8 | 41.0 |
| 8 |  | 0.16 | 17.5 | 40.5 |
| 9 | 1.9 | 0.60 | 3.2 | 43.6 |
| 10 |  | 0.44 | 4.5 | 42.6 |
| 11 |  | 0.25 | 7.6 | 41.7 |
| 12 |  | 0.16 | 11.9 | 40.8 |

In this case, samples, experimental objects, were manufactured as follows.

First, a plurality of ceramic green sheets having a thickness required for several experimental conditions were prepared by applying slurries including powder such as barium titanate (BaTiO3), and the like, to carrier films and drying the carrier films having the slurries applied thereto, whereby dielectric layers were formed.

Next, inner electrodes were formed using a conductive paste for a nickel inner electrode on the green sheets through a screen, and then 370 green sheets were laminated and the thickness of a cover layer was differently set to be 10 to 100 μm, whereby a ceramic laminate was manufactured.

The ceramic laminate was subjected to isostatic pressing under a pressure condition of 1,000 kgf/cm$^2$ at 85° C.

The pressed ceramic laminate was cut into individual chips and the cut chips were subjected to a debinder-treatment while being maintained at 230° C. for 60 hours in atmosphere. Thereafter, the chips were fired at 1200° C. in a reduction atmosphere under an oxygen partial pressure of 10$^{-11}$ atm to 10$^{-10}$ atm lower than a Ni/NiO balance oxygen partial pressure such that the inner electrodes are not oxidized. After firing, the size of the chips was 3.2 mm×1.6 mm×1.6 mm (L×W×T), and thicknesses of the dielectric layers and grain sizes thereof were shown in the above Table 1.

Referring to Table 1, when low dielectric permittivity is implemented by reducing the grain sizes under conditions in which the dielectric thickness is 4.3 μm as in samples 1 to 4, it could be appreciated that magnitude in acoustic noise is remarkably reduced. However, when low dielectric permittivity is implemented by reducing the grain sizes under conditions in which the dielectric thickness is about 3 μm or less as in samples 5 to 12, it could be appreciated that a reduction in acoustic noise is insignificant even in a case in which td/Dc, that is, a ratio of the grain size to the dielectric thickness is 1/10 or less.

Therefore, when the dielectric thickness is small, it could be appreciated that a reduction effect in acoustic noise may be further increased only in the case of adding separate conditions in addition to a reduction in the grain size.

Referring to FIG. 2, when the multilayer body 110 is cut in the length and thickness direction, the cross section (L-T cross section) taken in the length and thickness direction of the multilayer body 110 may be referred to a first cross section. In the first cross section, a portion in which the first and second inner electrodes 121 and 122 overlap in the thickness direction may be referred to as the first capacitance forming part $C_{LT}$, and a portion other than the first capacitance forming part $C_{LT}$ may be referred to as the first margin part $M_{LT}$.

In the embodiment of the present invention, a ratio MA1/CA1 of an area MA1 of the first margin part $M_{LT}$ to an area CA1 of the first cross section may be between 0.07 and 0.20. When the MA1/CA1 is below 0.07, acoustic noise may be increased to 40 dB or more and delaminations may occur, and when the MA1/CA1 exceeds 0.20, capacitance may be degraded to 9 µF or less.

Referring to FIG. 3, in the first margin part $M_{LT}$, a portion extending from the first capacitance forming part $C_{LT}$ in the length direction is referred to as a first length margin part $M_{LT1}$ and a portion extending from the first capacitance forming part $C_{LT}$ in the thickness direction may be referred to as a first thickness margin part $M_{LT2}$.

In the embodiment of the present invention, a ratio C1/A1 of an area C1 of the first thickness margin part $M_{LT2}$ to an area A1 of the first length margin part $M_{LT1}$ may be between 0.35 and 2.0. When the C1/A1 is below 0.35 or exceeds 2.0, acoustic noise may be increased to 40 dB or more.

A method of measuring the area of the cross section of the multilayer body 100 will be described with reference to FIGS. 6 and 7.

The area of the cross section or the area of the margin part shown in the embodiments of FIGS. 2 and 3 is difficult to have a complete linear boundary due to the plastic deformation of the multilayer body 100 or the inner electrode layers 120, but may be measured based on a substantially linear virtual line.

However, the boundary between the first and second inner electrodes 121 and 122 forming the capacitance forming part may be unclear. When the first and second inner electrodes 121 and 122 are deformed due to the firing, the ends of the first and second inner electrodes 121 and 122 may be offset as shown in FIGS. 6 and 7.

In this case, in order to measure the areas of the margin part and the capacitance forming part, the areas may be measured based on, as a boundary, intermediate values Xm and Ym between portions Xmax and Ymax in which offset deformation is greatest and portions Xmin and Ymin in which offset deformation is lowest, in the ends of the inner electrodes.

In this case, based on a distance between a side of the multilayer body 100 and the inner electrodes 121 and 122, the portions in which offset deformation is greatest correspond to a case in which the distance between the one side of the multilayer body 100 and the ends of the inner electrodes 121 and 122 is smallest and the portions in which offset deformation is lowest correspond to a case in which the distance between the one side of the multilayer body 100 and the ends of the inner electrodes 121 and 122 is greatest.

Referring to FIG. 4, when the multilayer body 110 is cut in the width and thickness direction, the cross section (W-T cross section) taken in the width and thickness direction of the multilayer body 110 may be referred to a second cross section. In the second cross section, a portion in which the first and second inner electrodes 121 and 122 overlap in the thickness direction may be referred to as a second capacitance forming part $C_{WT}$, and a portion other than the second capacitance forming part $C_{WT}$ may be referred to as a second margin part $M_{WT}$.

In the embodiment of the present invention, a ratio MA2/CA2 of an area MA2 of the second margin part $M_{WT}$ to an area CA2 of the second cross section may be between 0.10 and 0.28. When the MA2/CA2 is below 0.10, acoustic noise may be increased to 40 dB or more and delaminations may occur, and when the MA2/CA2 exceeds 0.28, capacitance may be degraded to 9 µF or less.

Referring to FIG. 5, in the second margin part $M_{WT}$, a portion extending from the second capacitance forming part $C_{WT}$ in the width direction is referred to as a first width margin part $M_{WT1}$ and a portion extending from the second capacitance forming part $C_{WT}$ in the thickness direction may be referred to as a second thickness margin part $M_{WT2}$.

In the embodiment of the present invention, a ratio C2/B1 of an area C2 of the second thickness margin part $M_{WT2}$ to an area B1 of the first width margin part $M_{WT1}$ may be between 0.3 and 1.35. When the C1/A1 is below 0.3 or exceeds 1.35, acoustic noise may be increased to 40 dB or more.

Hereinafter, the embodiment of the present will be described in detail with reference to Examples and Comparative Examples for the more detailed understanding of the present invention. The scope of the present invention is not limited to Examples.

Example

The multilayer ceramic capacitor according to the Example of the present invention was manufactured as follows.

First, a plurality of ceramic green sheets having a thickness of 3.9 µm were prepared by applying slurries including powder such as barium titanate (BaTiO3), and the like, to carrier films and drying the carrier films having the slurries applied thereto, whereby dielectric layers were formed.

Next, inner electrodes were formed using a conductive paste for a nickel inner electrode on the green sheets through a screen including multilayer ceramic capacitor patterns, the L margin and the W margin of which are set to be different from each other and then, 370 green sheets were laminated and the thickness of a cover layer was differently set to be 10 to 100 µm, whereby a ceramic laminate was manufactured.

The ceramic laminate was subjected to isostatic pressing under a pressure condition of 1000 kgf/cm2 at 85° C.

The pressed ceramic laminate was cut into individual chips and the cut chips were subjected to a debinder-treatment while being maintained at 230° C. for 60 hours in the atmosphere. Thereafter, the chips were fired at 1200° C. in a reduction atmosphere under an oxygen partial pressure of $10^{-11}$ atm to $10^{-10}$ atm lower than an Ni/NiO balance oxygen partial pressure such that the inner electrodes are not oxidized. After firing, the thickness of the dielectric layer was 2.7 µm, the average particle diameter of ceramic powder used in the dielectric layer was 0.27 µm, and the size of the chips was 3.2 mm×1.6 mm×1.6 mm (L×W×T).

Next, the multilayer ceramic capacitor was manufactured by processes, such as an outer electrode process, a plating process, and the like.

In this case, the samples of the multilayer ceramic capacitor were variously manufactured according to the area ratio of each of the margin parts.

The following Table 2 is a table in which acoustic noise, capacitance, and the incidence of delamination are compared according to the area ratio of the margin part to the cross section of the multilayer body. The noise (acoustic noise) was measured in an anechoic chamber by applying a pulse wave of 3Vpp to DC voltage of 12.5V, the capacitance of 100 samples was measured at 1 kHz, and the incidence of delamination was represented by performing the internal analysis on 100 samples.

TABLE 2

| No. | L-T Cross Section | | | W-T Cross Section | | | Capacitance (μF) | Acoustic Noise (dB) | Delam. (%) |
|---|---|---|---|---|---|---|---|---|---|
| | CA1 | MA1 | MA1/CA1 | CA2 | MA2 | MA2/CA2 | | | |
| 1* | 4.867 | 0.204 | 0.042 | 2.524 | 0.152 | 0.06 | 12.89 | 45.1 | 78 |
| 2* | 4.877 | 0.232 | 0.048 | 2.519 | 0.173 | 0.069 | 12.75 | 45.3 | 44 |
| 3* | 4.930 | 0.265 | 0.054 | 2.539 | 0.198 | 0.078 | 12.72 | 44.8 | 26 |
| 4* | 4.925 | 0.303 | 0.061 | 2.558 | 0.226 | 0.088 | 12.51 | 43.4 | 18 |
| 5 | 4.952 | 0.346 | 0.07 | 2.561 | 0.257 | 0.1 | 12.36 | 33.9 | 0 |
| 6 | 4.891 | 0.391 | 0.08 | 2.527 | 0.289 | 0.114 | 11.96 | 33.8 | 0 |
| 7 | 4.867 | 0.446 | 0.092 | 2.526 | 0.329 | 0.13 | 11.63 | 33.4 | 0 |
| 8 | 4.838 | 0.509 | 0.105 | 2.503 | 0.372 | 0.149 | 11.19 | 32.5 | 0 |
| 9 | 4.911 | 0.588 | 0.12 | 2.547 | 0.429 | 0.169 | 11.03 | 31.4 | 0 |
| 10 | 4.895 | 0.673 | 0.138 | 2.547 | 0.489 | 0.192 | 10.59 | 31.0 | 0 |
| 11 | 4.863 | 0.770 | 0.158 | 2.530 | 0.554 | 0.219 | 10.1 | 30.1 | 0 |
| 12 | 4.886 | 0.887 | 0.181 | 2.532 | 0.632 | 0.249 | 9.64 | 28.7 | 0 |
| 13 | 4.892 | 1.020 | 0.209 | 2.534 | 0.720 | 0.284 | 9.09 | 27.5 | 0 |
| 14* | 4.836 | 1.167 | 0.241 | 2.509 | 0.814 | 0.324 | 8.37 | 26.4 | 0 |
| 15* | 4.870 | 1.349 | 0.277 | 2.521 | 0.927 | 0.368 | 7.78 | 25.3 | 0 |
| 16* | 4.869 | 1.554 | 0.319 | 2.514 | 1.051 | 0.418 | 7.03 | 24.5 | 0 |
| 17* | 4.895 | 1.794 | 0.367 | 2.523 | 1.193 | 0.473 | 6.28 | 23.5 | 0 |

✳CA1: the area of the first cross section (L-T cross section) of the multilayer body, MA1: the area of the first margin part $M_{LT}$, CA2: the area of the second cross section (W-T cross section) of the multilayer body, MA2: the area of the second margin part $M_{WT}$,
*Comparative Example Referring to Table 2, samples 1 to 4 and 14 to 17 are Comparative Examples and samples 5 to 13 are Examples.

It could be appreciated that in samples 5 to 13 corresponding to the Examples of the present invention, acoustic noise is 27.5 to 33.9 dB, which is more remarkably reduced than in samples 1 to 4 corresponding to Comparative Examples. In addition, in samples 5 to 13 corresponding to Examples of the present invention, the incidence of delamination is 0%, which results in securing the excellent reliability and capacitance may be 9 μF or more, for example, 9.09 to 12.36 μF, which results in securing high capacitance.

Meanwhile, it could be appreciated that in samples 1 to 4 corresponding to Comparative Examples, capacitance is high as 12 μF or more but acoustic noise is 43 dB or more and the incidence of delamination is also increased. It could be appreciated that in samples 14 to 17 corresponding to Comparative Examples, the incidence of delamination is 0% and the acoustic noise is remarkably reduced to 27 dB or less while the capacitance is suddenly reduced.

Therefore, it could be appreciated that in the Examples of the present invention, the incidence of delamination may be reduced and high capacitance may be realized while remarkably reducing acoustic noise, as compared with Comparative Examples.

The following Table 3 is a table in which acoustic noise, capacitance, and the incidence of delamination are compared according to the area ratio of each of the margin parts.

TABLE 3

| No. | L-T Cross Section | | | W-T Cross Section | | | Capacitance (μF) | Acoustic Noise (dB) | Delam. (%) |
|---|---|---|---|---|---|---|---|---|---|
| | A1 | C1 | C1/A1 | B1 | C2 | C2/B1 | | | |
| 21* | 0.293 | 0.027 | 0.09 | 0.179 | 0.014 | 0.08 | 10.51 | 42.1 | 12 |
| 22* | 0.258 | 0.056 | 0.22 | 0.161 | 0.028 | 0.18 | 10.7 | 40.8 | 0 |
| 23 | 0.242 | 0.085 | 0.35 | 0.143 | 0.043 | 0.30 | 10.92 | 32.0 | 0 |
| 24 | 0.203 | 0.114 | 0.56 | 0.129 | 0.058 | 0.45 | 11.1 | 31.4 | 0 |
| 25 | 0.169 | 0.145 | 0.86 | 0.116 | 0.073 | 0.63 | 11.31 | 31.0 | 0 |
| 26 | 0.134 | 0.177 | 1.32 | 0.094 | 0.089 | 0.96 | 11.37 | 31.5 | 0 |
| 27 | 0.104 | 0.208 | 2.0 | 0.078 | 0.106 | 1.35 | 11.47 | 33.4 | 0 |
| 28* | 0.077 | 0.238 | 3.1 | 0.064 | 0.12 | 1.88 | 11.47 | 41.0 | 0 |
| 29* | 0.056 | 0.273 | 4.9 | 0.047 | 0.139 | 2.94 | 11.8 | 42.2 | 10 |
| 30* | 0.034 | 0.307 | 9.03 | 0.027 | 0.158 | 5.80 | 11.84 | 44.3 | 60 |

✳A1: the area of the first length margin part $M_{LT1}$, C1: the area of the first thickness margin part $M_{LT2}$, B1: the area of the first width margin part $M_{WT1}$, C2: the area of the second thickness margin part $M_{WT2}$,
*Comparative Example Referring to Table 3, samples 21, 22, and 28 to 30 are Comparative Examples and samples 23 to 27 are Examples of the present invention.

It could be appreciated that in samples 23 to 27 corresponding to the Examples of the present invention, acoustic noise is 31 to 33.4 dB, which is more remarkably reduced than in samples 21, 22, and 28 to 30 corresponding to the Comparative Examples. In addition, in samples 23 to 27 corresponding to the Examples of the present invention, the incidence of delamination is 0%, which results in securing the excellent reliability and capacitance may be 11 μF or more, for example, 10.92 to 11.47 μF, which results in securing high capacitance.

Meanwhile, samples 28 to 30 corresponding to the Comparative Examples, the capacitance is high as approximately 11.5 μF, but the acoustic noise is 41 dB or more. In particular, it is shown that in samples 29 and 30, the incidence of delamination is high as 10% or more. In samples 1 and 2 corresponding to the Comparative Examples, the acoustic noise is 40 dB or more and the capacitance is reduced to 10.7 μF or less. In particular, it is shown that in sample 1, the incidence of delamination is 12%, which results in degrading the reliability.

Therefore, it could be appreciated that in the Examples of the present invention, the incidence of delamination may be reduced and high capacitance may be realized while acoustic noise are remarkably reduced, as compared with the Comparative Examples.

As set forth above, according to embodiments of the present invention, there is provided a small-sized and high-capacitance multilayer ceramic capacitor having high reliability and reduced acoustic noise while suppressing a generation of delaminations.

Although the embodiments of the present invention have been described in detail, they are only examples. It will be appreciated by those skilled in the art that various modifications and equivalent other embodiments are possible from the present invention. Accordingly, the actual technical protection scope of the present invention must be determined by the spirit of the appended claims.

What is claimed is:

1. A multilayer ceramic capacitor, comprising:
    a multilayer body in which a plurality of dielectric layers are stacked in a thickness direction; and
    inner electrode layers formed within the multilayer body and including first and second inner electrodes disposed to be opposed to each other while having each dielectric layer disposed therebetween and having respective ends alternately exposed to sides of the multilayer body, opposing each other;
    wherein a ratio (C1/A1) of C1 to A1 is between 0.35 and 2.0,
        wherein A1 represents an area of a first length margin part in the cross section of the multilayer body taken in the length and thickness direction, the first length margin part being a portion of the first margin part extending from the first capacitance forming part in a length direction, and
        C1 represents an area of a first thickness margin part in the cross section of the multilayer body taken in the length and thickness direction, the first thickness margin part being a portion of the first margin part extending from the first capacitance forming part in a thickness direction in the cross section of the multilayer body taken in the length and thickness direction.

2. The multilayer ceramic capacitor of claim 1, wherein a ratio (MA1/CA1) of MA1 to CA1 is between 0.07 and 0.20, wherein CA1 represents an area of the multilayer body in a cross section of the multilayer body taken in a length and thickness direction, and
    MA1 represents an area of a first margin part in the cross section of the multilayer body taken in the length and thickness direction, the first margin part being a portion of the multilayer body, other than a first capacitance forming part thereof in which the first and second inner electrodes overlap in the thickness direction in the cross section of the multilayer body taken in the length and thickness direction.

3. The multilayer ceramic capacitor of claim 1, wherein a ratio (MA2/CA2) of MA2 to CA2 is between 0.10 and 0.28,
    wherein CA2 represents an area of the multilayer body in a cross section of the multilayer body taken in a width and thickness direction, and
    MA2 represents an area of a second margin part in the cross section of the multilayer body taken in the width and thickness direction, the second margin part being a portion of the multilayer body, other than a second capacitance forming part thereof in which the first and second inner electrodes overlap in the thickness direction in the cross section of the multilayer body taken in the width and thickness direction.

4. The multilayer ceramic capacitor of claim 3, wherein a ratio (C2/B1) of C2 to B1 is between 0.30 and 1.35,
    wherein B1 represents an area of a first width margin part in the cross section of the multilayer body taken in the width and thickness direction, the first width margin part being a portion of the second margin part extending from the second capacitance forming part in a width direction in the cross section of the multilayer body taken in the width and thickness direction, and
    C2 represents an area of a second thickness margin part in the cross section of the multilayer body taken in the width and thickness direction, the second thickness margin part being a portion of the second margin part extending from the second capacitance forming part in a thickness direction in the cross section of the multilayer body taken in the width and thickness direction.

5. The multilayer ceramic capacitor of claim 1, wherein a thickness of the dielectric layer is 3 μm or less.

6. The multilayer ceramic capacitor of claim 1, wherein an average particle diameter of ceramic powder particles used for the dielectric layer is 0.3 μm or less.

* * * * *